(12) United States Patent
Ikeda

(10) Patent No.: US 11,701,715 B2
(45) Date of Patent: Jul. 18, 2023

(54) CUTTING INSERT, CUTTING TOOL, AND METHOD FOR MANUFACTURING MACHINED PRODUCT

(71) Applicant: KYOCERA Corporation, Kyoto (JP)

(72) Inventor: Yoshihito Ikeda, Ritto (JP)

(73) Assignee: KYOCERA Corporation, Kyoto (JP)

( * ) Notice: Subject to any disclaimer, the term of this patent is extended or adjusted under 35 U.S.C. 154(b) by 308 days.

(21) Appl. No.: 16/644,701

(22) PCT Filed: Sep. 21, 2018

(86) PCT No.: PCT/JP2018/035138
§ 371 (c)(1),
(2) Date: Mar. 5, 2020

(87) PCT Pub. No.: WO2019/065525
PCT Pub. Date: Apr. 4, 2019

(65) Prior Publication Data
US 2020/0282466 A1    Sep. 10, 2020

(30) Foreign Application Priority Data

Sep. 27, 2017  (JP) ................................ 2017-186254

(51) Int. Cl.
*B23B 27/16* (2006.01)
*B23B 27/14* (2006.01)
*B23B 35/00* (2006.01)

(52) U.S. Cl.
CPC .......... *B23B 27/1603* (2013.01); *B23B 35/00* (2013.01); *B23B 27/145* (2013.01);
(Continued)

(58) Field of Classification Search
CPC .... B23B 2200/3672; B23B 2200/3663; B23B 2200/3654; B23B 2200/3645;
(Continued)

(56) References Cited

U.S. PATENT DOCUMENTS 4,616,963 A    10/1986  Habert et al.
5,876,160 A *  3/1999  Johnson ................. B23C 5/202
                                                 407/42
(Continued)

FOREIGN PATENT DOCUMENTS

CN    101107089 A    1/2008
DE    19856931 A1 *  6/2000 ........... B23B 27/141
(Continued)

*Primary Examiner* — Sara Addisu
(74) *Attorney, Agent, or Firm* — Volpe Koenig

(57) ABSTRACT

A cutting insert in a non-limiting embodiment may include a first surface, a second surface, a third surface and a land surface. The first surface may include a first corner and a first side extended from the first corner. The land surface may be located between the first surface and the third surface and inclined relative to the first surface and the third surface. The land surface may include a first land surface located along the first corner, a second land surface located along the first side, and a third land surface having a concave shape which is adjacent to the second land surface and located further away from the first land surface than the second land surface.

9 Claims, 17 Drawing Sheets

(52) U.S. Cl.
CPC ... *B23B 2200/201* (2013.01); *B23B 2200/242* (2013.01); *B23B 2200/3672* (2013.01)

(58) Field of Classification Search
CPC ........ B23B 2200/201; B23B 2200/242; B23B 27/145; B23B 27/141; B23B 27/14; B23B 27/143; B23B 27/1603; B23B 27/1611; B23B 27/1622; B23B 35/00; B23C 2200/366; B23C 2200/365; B23C 2200/201; B23C 2200/243; B23C 2210/321
See application file for complete search history.

(56) References Cited

U.S. PATENT DOCUMENTS

| | | | | |
|---|---|---|---|---|
| 10,245,644 | B2 * | 4/2019 | Kukino | ..................... B24B 3/34 |
| 11,229,961 | B2 * | 1/2022 | Eriksson | ............... B23C 5/2247 |
| 2002/0127068 | A1 * | 9/2002 | Kinukawa | ............. B23B 27/145 |
| | | | | 407/113 |
| 2006/0188347 | A1 * | 8/2006 | Kratz | .................... B23B 27/145 |
| | | | | 407/113 |
| 2006/0228179 | A1 | 10/2006 | Alm et al. | |
| 2008/0292415 | A1 * | 11/2008 | Kuroda | ................. B23B 27/145 |
| | | | | 83/53 |
| 2010/0278599 | A1 | 11/2010 | Zitzlaff et al. | |
| 2016/0297010 | A1 | 10/2016 | Kukino et al. | |
| 2019/0321898 | A1 * | 10/2019 | Eriksson | ............... B23C 5/2213 |
| 2020/0338645 | A1 * | 10/2020 | Moroguchi | ........... B23B 27/145 |

FOREIGN PATENT DOCUMENTS

| | | | | |
|---|---|---|---|---|
| DE | 10006431 | C1 | 9/2001 | |
| JP | 63-013601 | U | 1/1988 | |
| JP | 02-043105 | U | 3/1990 | |
| JP | 02-053302 | U | 4/1990 | |
| JP | 2000-513659 | A | 10/2000 | |
| JP | 2002-046002 | A | 2/2002 | |
| JP | 2005-103658 | A | 4/2005 | |
| JP | 2007-119859 | A | 5/2007 | |
| JP | 2010-527801 | A | 8/2010 | |
| JP | 2011115934 | A * | 6/2011 | ............. B23B 27/14 |
| WO | WO-2006091141 | A1 * | 8/2006 | ........... B23B 27/145 |
| WO | 2012/023325 | A1 | 2/2012 | |
| WO | WO-2014192798 | A1 * | 12/2014 | ........... B23B 27/143 |
| WO | 2016/043127 | A1 | 3/2016 | |

* cited by examiner

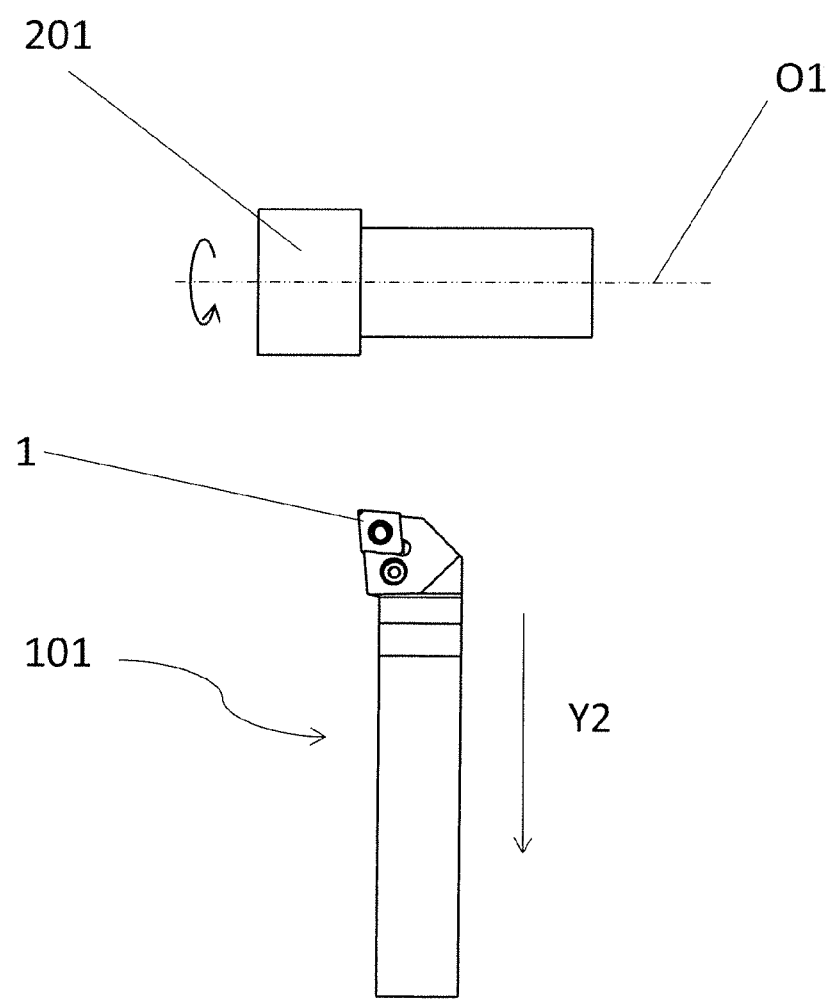

CUTTING INSERT, CUTTING TOOL, AND METHOD FOR MANUFACTURING MACHINED PRODUCT

CROSS-REFERENCE TO RELATED APPLICATIONS

This application is a national stage entry according to 35 U.S.C. 371 of PCT Application No. PCT/JP2018/035138 filed on Sep. 21, 2018, which claims priority to Japanese Application No. 2017-186254 filed on Sep. 27, 2017, which is entirely incorporated herein by reference.

TECHNICAL FIELD

The present disclose relates to cutting inserts, cutting tools, and methods for manufacturing a machined product. More specifically, the present disclose relates to cutting inserts and cutting tools for use in turning tools, as well as methods for manufacturing a machined product.

BACKGROUND

Cutting tools respectively discussed in WO 2016/043127 (Patent Document 1) and Japanese Unexamined Utility Model Application Publication No. 2-43105 (Patent Document 2) may be cutting tools for use in a cutting process of a workpiece, such as metal. A cutting insert (insert) in the cutting tool discussed in Patent Document 1 may include negative lands (land surfaces) respectively disposed along a ridgeline of a linear cutting edge and a ridgeline of a cutting edge with a nose radius.

SUMMARY

A cutting insert in a non-limiting aspect of the present disclosure may include a first surface, a second surface and a third surface. The first surface may include a first corner and a first side extended from the first corner. The second surface may be located on a side opposite to the first surface. The third surface may be located between the first surface and the second surface. The cutting insert may also include a land surface which is located between the first surface and the third surface and inclined relative to the first surface and the third surface. The land surface may include a first land surface located along the first corner, a second land surface located along the first side, and a third land surface having a concave shape. The third land surface may be adjacent to the second land surface and located further away from the first land surface than the second land surface.

BRIEF DESCRIPTION OF THE DRAWINGS

FIG. 17 is a diagram illustrating one of the steps in the method for manufacturing a machined product in a non-limiting embodiment of the present disclosure.

EMBODIMENTS

<Cutting Inserts>

Figure 1:
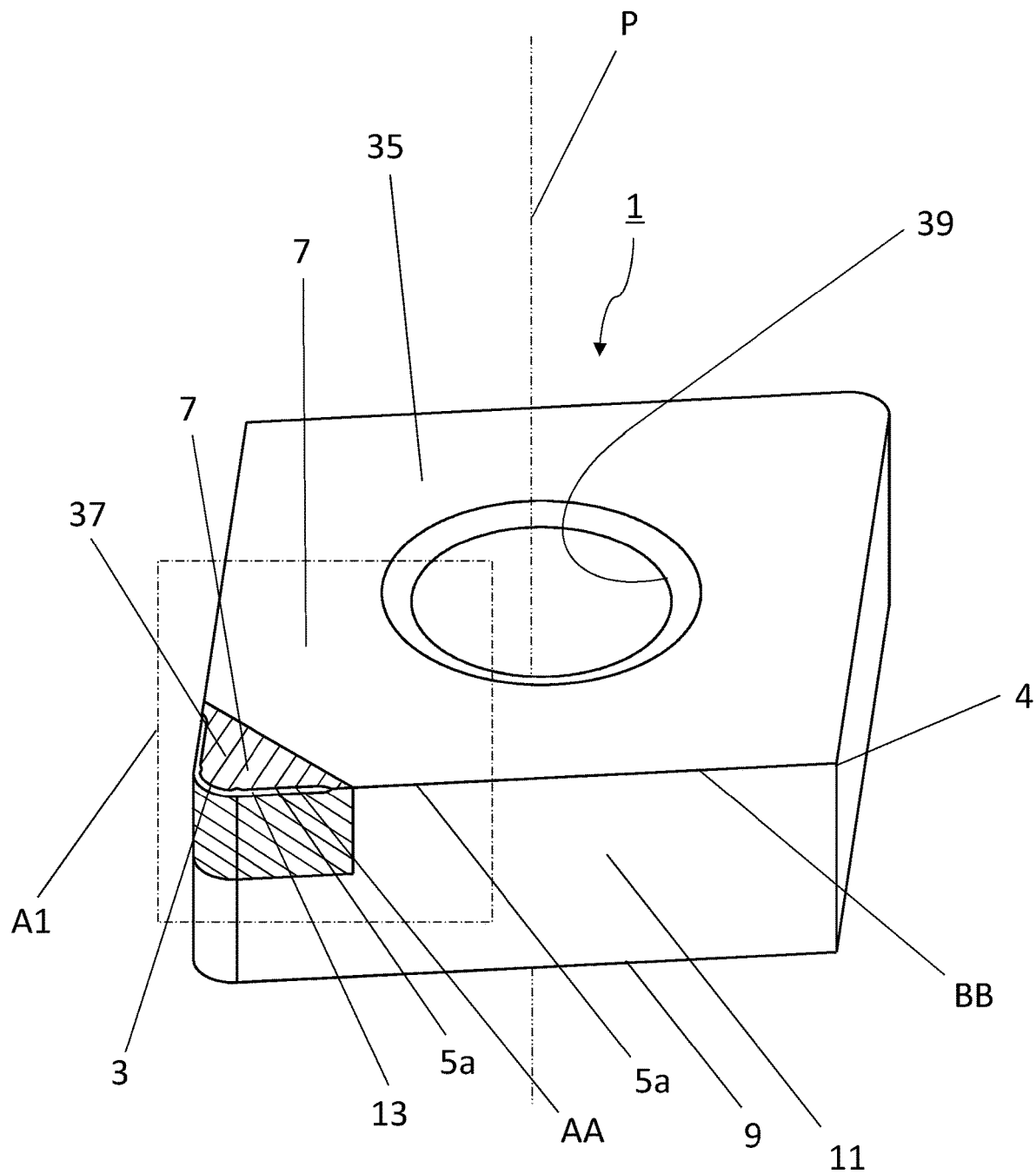
FIG. 1 is a perspective view illustrating a cutting insert in a non-limiting embodiment of the present disclosure.

The cutting inserts 1 (hereinafter also referred to simply as "inserts 1") in a plurality of non-limiting embodiments are described in detail below with reference to the drawings. For the sake of description, the drawings referred to in the following illustrate, in simplified form, only main members necessary for describing the inserts 1 in non-limiting embodiments. The cutting inserts 1 in the present disclosure may be therefore capable of including any arbitrary structural member not illustrated in the drawings referred to. Dimensions of the members in each of the drawings faithfully may represent neither dimensions of actual structural members nor dimensional ratios of these members.

The insert 1 in a non-limiting embodiment may include a first surface 7, a second surface 9 and a third surface 11 as illustrated in FIG. 1. The first surface 7 may be an upper surface in FIG. 1. The first surface 7 may include a first corner 3, a second corner 4, and a first side 5*a* extended from the first corner 3 to the second corner 4. The second surface 9 may be a lower surface in FIG. 1. The second surface 9 may be located on a side opposite to the first surface 7. The third surface 11 may be a side surface in FIG. 1. The third surface 11 may be located between the first surface 7 and the second surface 9.

Figure 2:
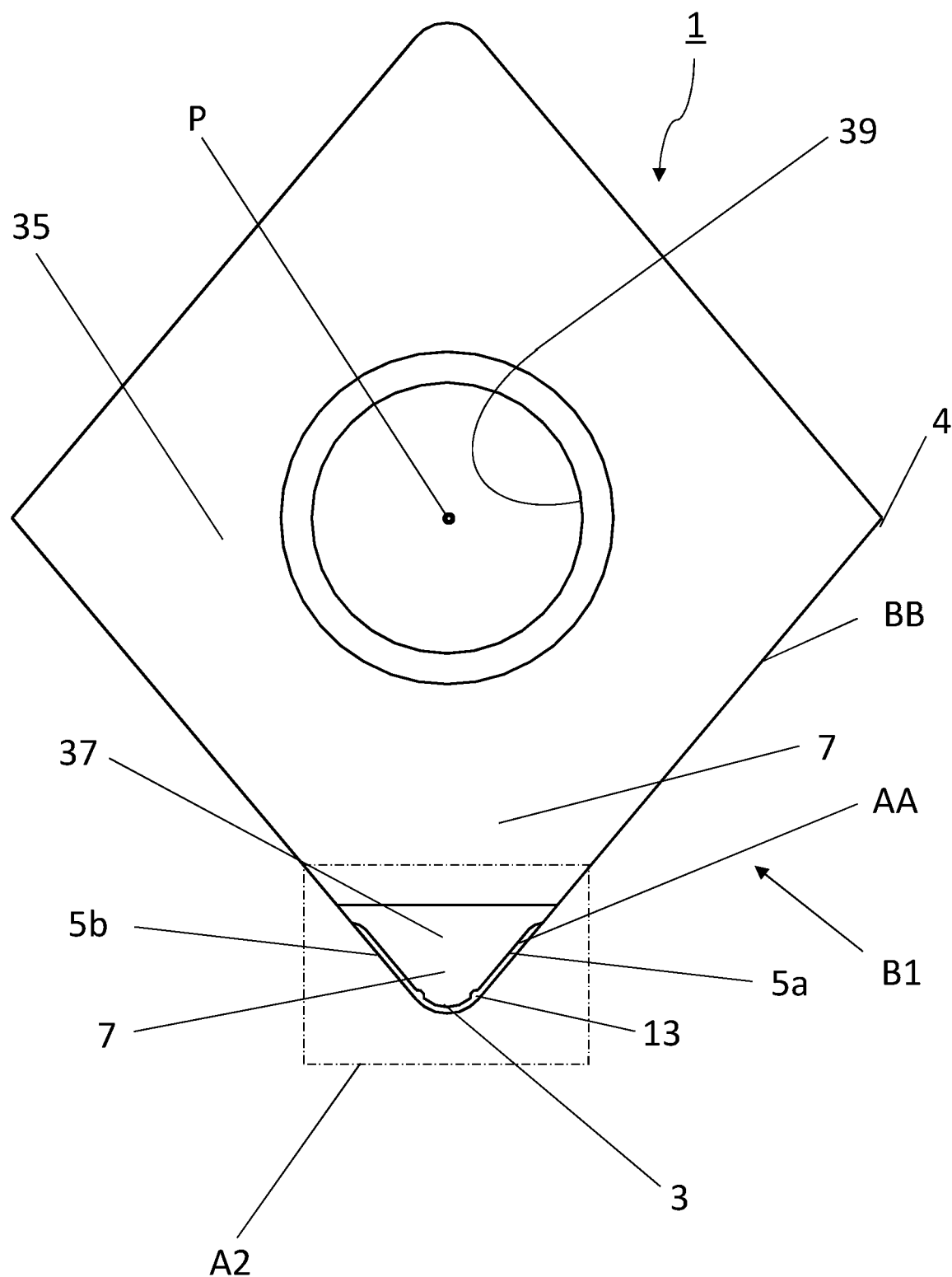
FIG. 2 is a front view of the cutting insert illustrated in FIG. 1 as viewed from a side of a first surface.

The first surface 7 may have a polygonal shape, and the first surface 7 may have a rhombus shape in a non-limiting embodiment illustrated in FIG. 2. Accordingly, the first surface 7 may include four corners and four sides. The third surface 11 may include four planar regions because the first surface 7 has the rhombus shape.

The first corner 3 may be one of the four corners included in the first surface 7, and the first side 5*a* may be one of the four sides included in the first surface 7 in FIG. 2. An axis passing through a center of the first surface 7 and a center of the second surface 9 may be a central axis P.

The first surface 7 may have an approximately polygonal shape and need not have a strict polygonal shape. That is, the sides of the first surface 7 having the polygonal shape need not have a strict straight line shape but may have, for example, a convex curvilinear shape or concave curvilinear shape. The corners in the first surface 7 having the polygonal shape are not limited to a structure formed by intersection of two straight lines, but may have, for example, an outwardly rounded shape. The first corner 3 may have a convex curvilinear shape in a non-limiting embodiment illustrated in FIGS. 3 and 4.

The shape of the first surface 7 is not limited to the above configuration. There is no problem even if the first surface 7 has, for example, a pentagonal shape, a hexagonal shape or an octagonal shape instead of the quadrangular shape.

Dimensions of the insert 1 are not particularly limited. For example, a length of one side of the first surface 7 may be settable to approximately 3-20 mm. A height from the first surface 7 to the second surface 9 may be settable to approximately 5-20 mm.

Alternatively, the insert 1 may include a hole 39 that opens into the first surface 7. The hole 39 may penetrate through the second surface 9 located on a side opposite to the first surface 7. An axis passing through a center of the hole 39 may coincide with the central axis P in a non-limiting embodiment illustrated in FIG. 1. The hole 39 is not limited to the above embodiment but may open into, for example, the third surface 11. The hole 39 may be one which penetrates from one of planar regions of the third surface 11 to another one located on a side opposite to the planar region.

The hole 39 may be used as an insertion hole for a fixing tool when attaching the insert 1 to a holder. Examples of the fixing tool may include a screw, a clamping member and a wedge. Alternatively, the insert 1 may be fixed to the holder by using a brazing material.

Figure 5:
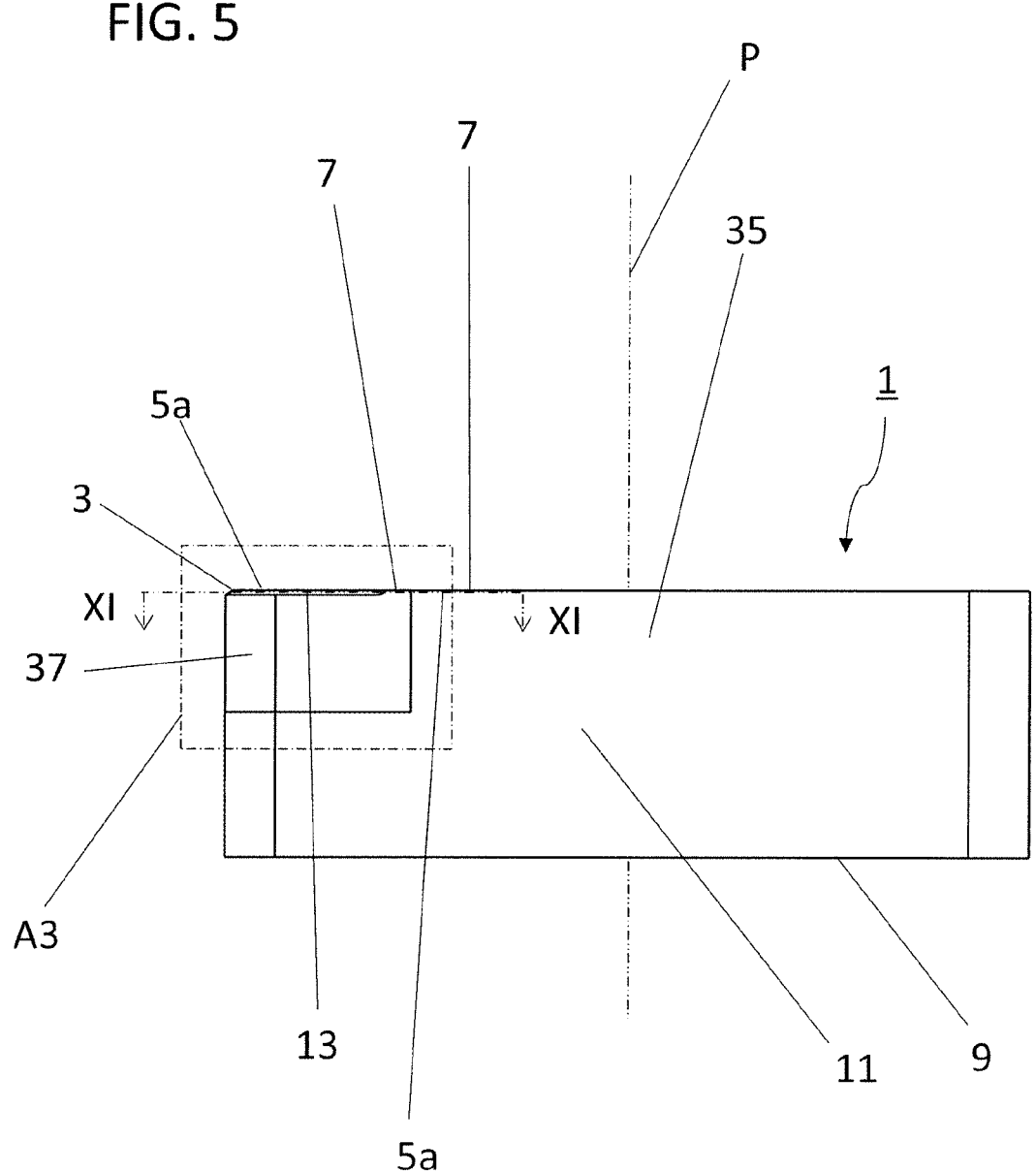
FIG. 5 is a side view illustrating the cutting insert illustrated in FIG. 2 as viewed from a B1 direction.
Figure 6:
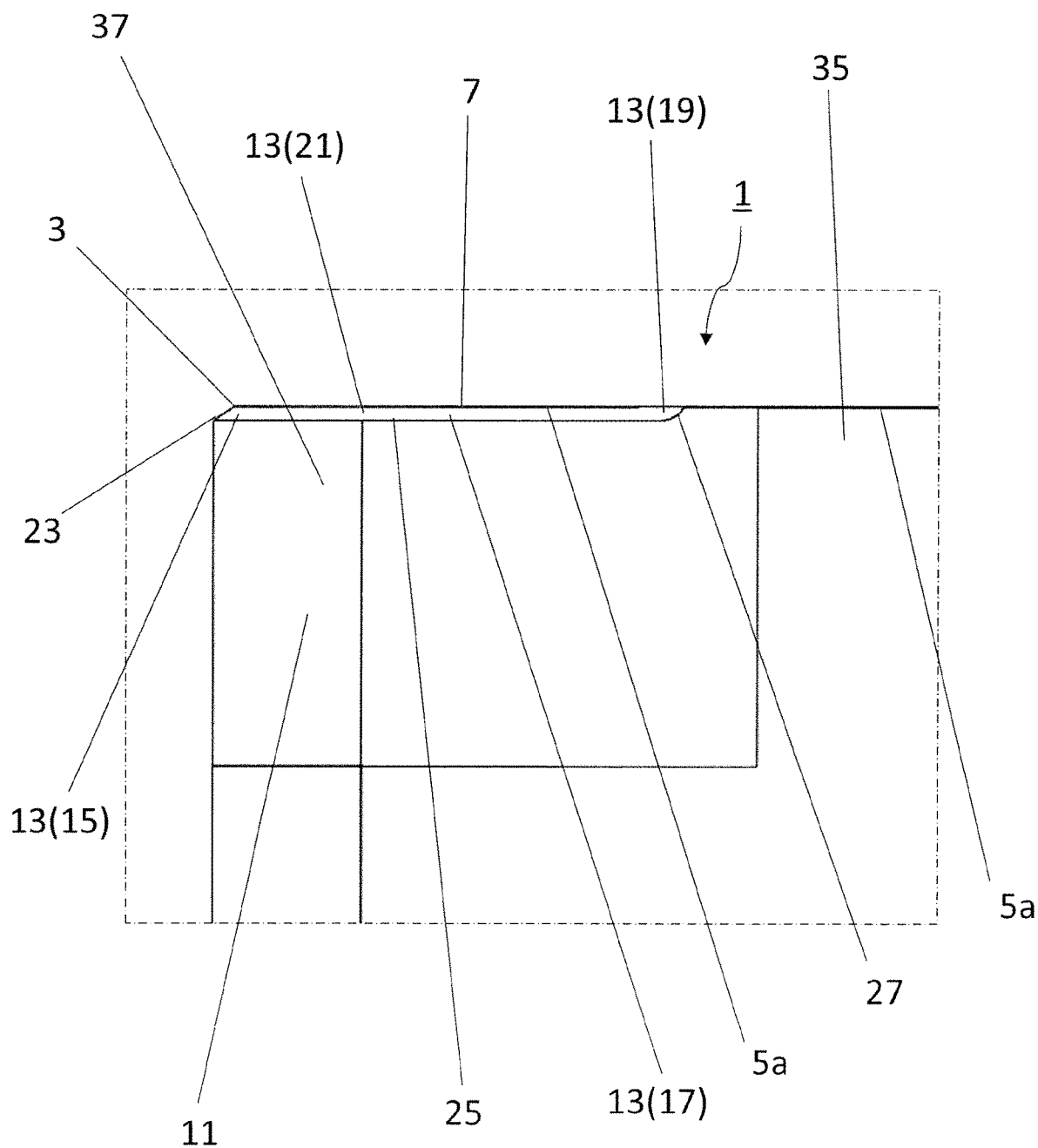
FIG. 6 is an enlarged view illustrating a region A3 in FIG. 5.

The insert 1 may include a land surface 13 located between the first surface 7 and the third surface 11 in a non-limiting embodiment. The land surface 13 may be inclined relative to the first surface 7 and the third surface 11 in a non-limiting embodiment illustrated in FIGS. 5 and 6. The land surface 13 may have a first end 41 located between the first corner and the second corner. The first side 5a may have a first part AA extending from the first corner to the first end 41. The first side 5a may have a second part BB extending from the first end 41 to the second corner.

The land surface 13 may include a first land surface 15, a second land surface 17 and a third land surface 19. The first land surface 15 may be located along the first corner 3. The second land surface 17 may be located along the first side 5a. The third land surface 19 may be adjacent to the second land surface 17 and located further away from the first land surface 15 than the second land surface 17. The third land surface 19 may have a concave shape.

The land surface 13 may be generally called "land" that is a narrow-width flat surface extended along a cutting edge. If the insert 1 includes the land surface 13, the cutting edge may have high durability. The term "extended along" in the present disclosure may denote a state in which two objects are extended approximately parallel to each other. The two objects may be in contact with each other or may be kept away from each other.

The third land surface 19 may connect to the second land surface 17. Specifically, the second land surface 17 may include a first end portion adjacent to the first land surface 15, and a second end portion located on a side opposite to the first end portion. The third land surface 19 may connect to the second end portion.

Figure 4:
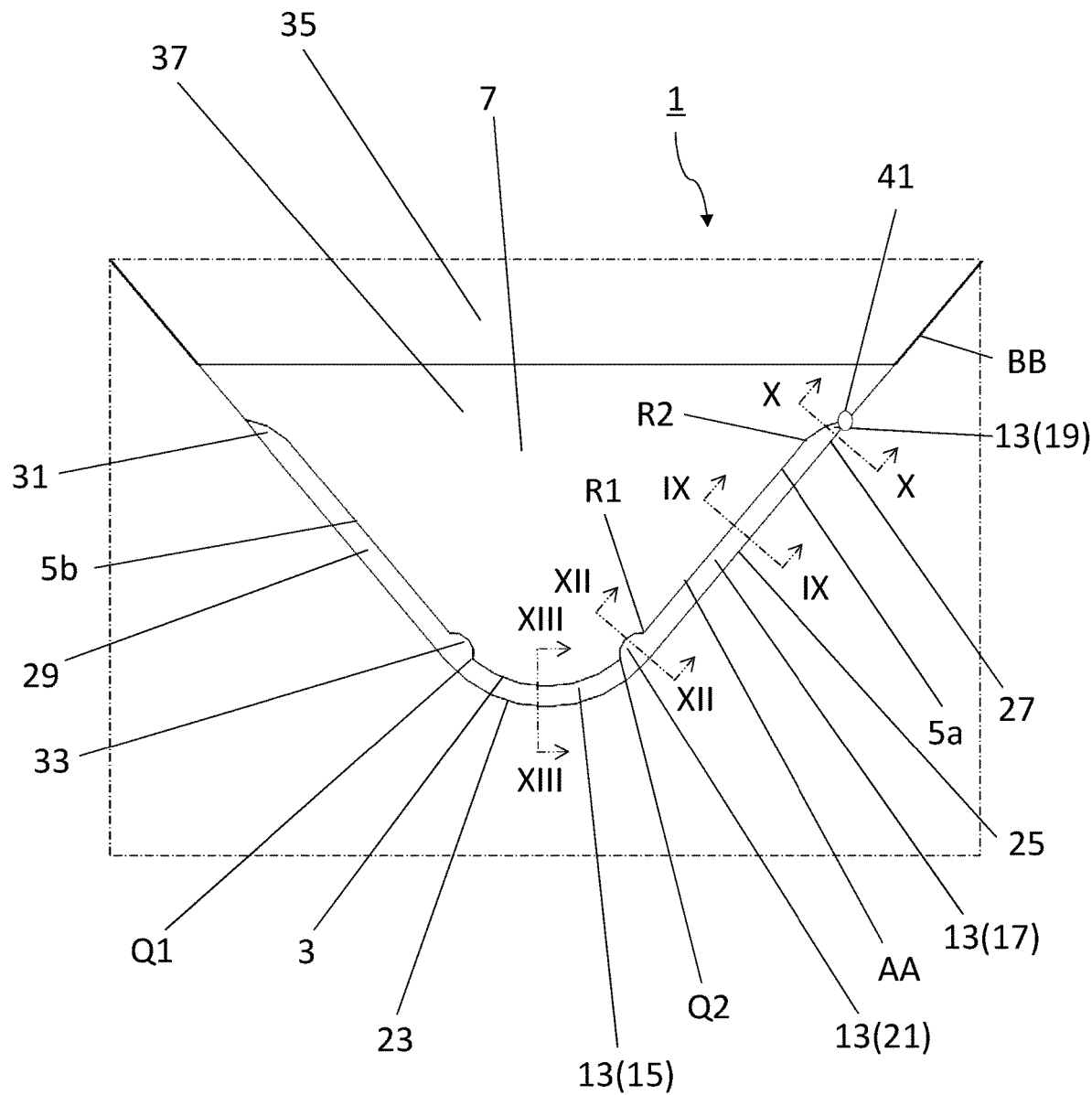
FIG. 4 is an enlarged view illustrating a region A2 in FIG. 2.

The first corner 3 may have a convex curvilinear shape protruded outward of the insert 1, and the first land surface 15 may be located along the first corner 3 in a non-limiting embodiment illustrated in FIG. 4. The first side 5a may have a straight line shape, and the second land surface 17 may be located along the first side 5a. The third land surface 19 may have a concave shape recessed toward inside of the insert 1. Similarly to the second land surface 17, the third land surface 19 may be located along the first side 5a.

The phrase that "the third land surface 19 has the concave shape" in the present disclosure may denote being a shape satisfying at least one of the following two conditions. The first condition may be that an intersection (ridgeline) of the first surface 7 and the third land surface 19 has a concave shape in a front view of the first surface 7. The second condition may be that the third land surface 19 has a concave shape in a cross section orthogonal to the central axis P.

The insert 1 may include a cutting edge located on at least a portion of an intersection of the land surface 13 and the third surface 11. If the cutting edge is located at the portion, at least a part of the first surface 7 may be a rake surface region 7a. A region in the first surface 7 which is located along the land surface 13 may be the rake surface region 7a in a non-limiting embodiment illustrated in FIG. 3.

At least a part of the third surface 11 may be a flank surface region 11a. A region in the third surface 11 which is located along the land surface 13 may be the flank surface region 11a in a non-limiting embodiment illustrated in FIG. 3.

The cutting edge may include a first cutting edge 23, a second cutting edge 25 and a third cutting edge 27. The first cutting edge 23 may be located on an intersection of the first land surface 15 and the third surface 11. The second cutting edge 25 may be located on an intersection of the second land surface 17 and the third surface 11. The third cutting edge 27 may be located on an intersection of the third land surface 19 and the third surface 11.

Chips generated by the cutting edges during a cutting process of a workpiece may tend to be gently curved while extending spirally. With the insert 1 including the above configurations in a non-limiting embodiment, the third land surface 19 may be readily servable as a guide for the chips when the chips come into contact with the third land surface 19. Thus, with the insert 1 in a non-limiting embodiment, the chips may tend to be discharged toward a feed direction of a cutting tool. In other words, the chips may be less likely to flow toward a machined surface of the workpiece. The machined surface may be therefore less prone to damage. Consequently, the insert 1 may provide a good machined surface in a non-limiting embodiment.

Figure 7:
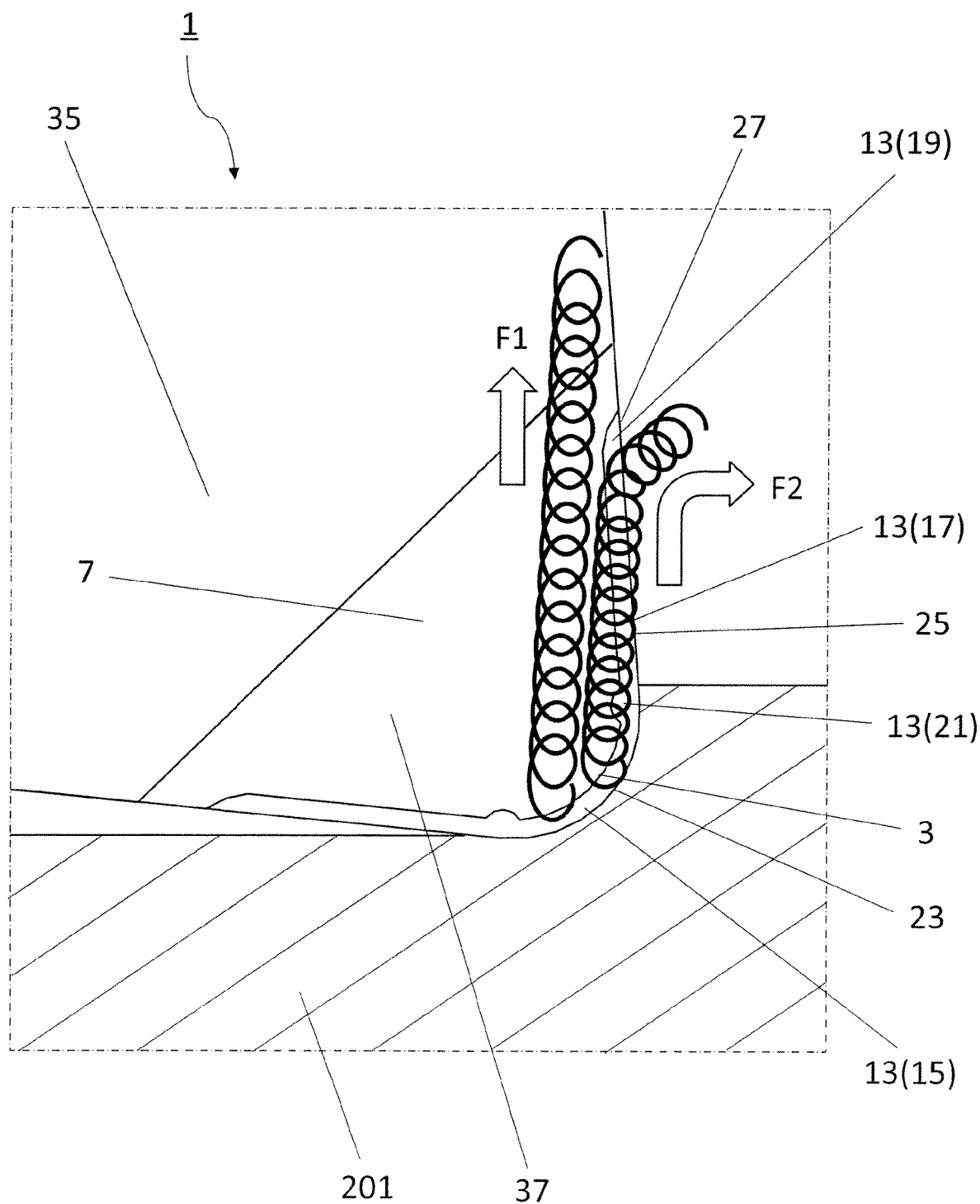
FIG. 7 is a conceptual diagram of a cutting process carried out using the cutting insert illustrated in FIG. 1.

Specifically, for example, chips generated by the first cutting edge 23 may tend to be guided by the third land surface 19 as illustrated in FIG. 7. The chips may be therefore liable to flow in an F2 direction that is the feed direction of the cutting tool, instead of an F1 direction directed to the machined surface. Hence, the insert 1 may have good chip discharge performance, and the machined surface may be less prone to damage due to the chips.

Figure 8:
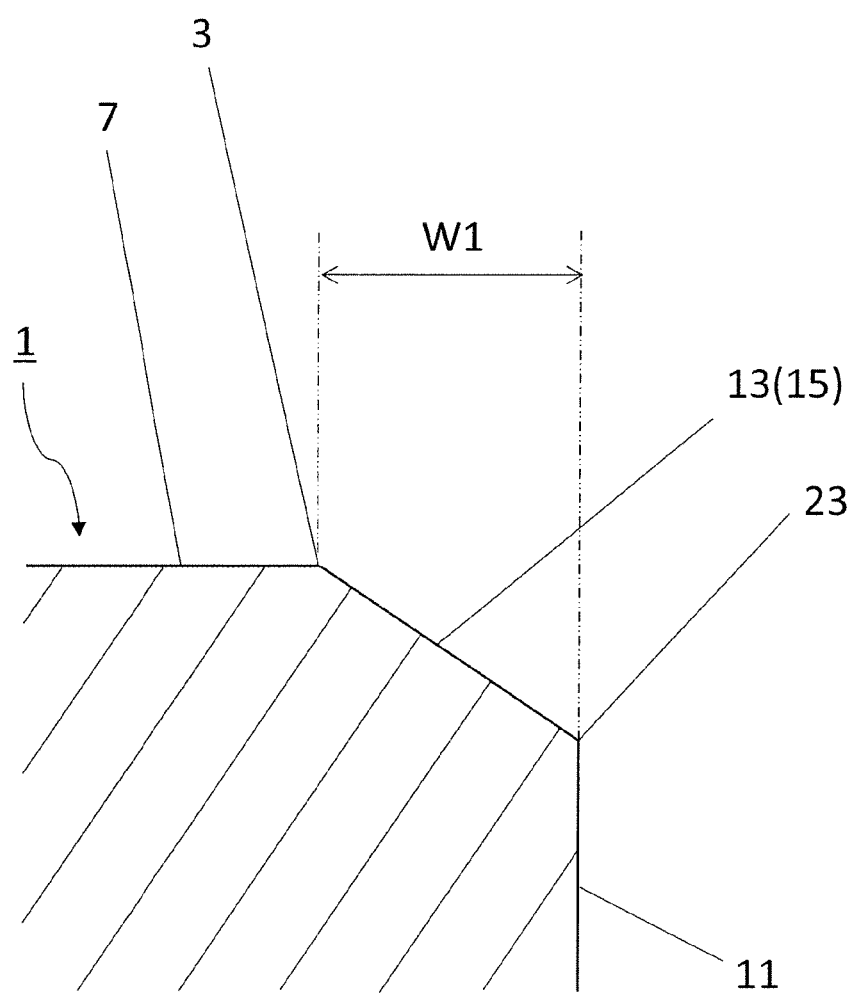
FIG. 8 is a sectional view taken along line XIII-XIII in FIG. 4.

In a non-limiting embodiment illustrated in FIG. 8 that is a cross section orthogonal to the first corner 3, the first land surface 15 may be inclined relative to the first surface 7 and the third surface 11, and may have a straight line shape. The straight line shape may not be a strict straight line but may include an unavoidable degree of micro concave shape or convex shape in manufacturing (which corresponds to, for example, an approximately 1/10 or less of a width W1 of the first land surface 15 in the front view of the first surface 7).

The width W1 of the first land surface 15 in a direction orthogonal to the first corner 3 may be settable to, for example, approximately 0.01-0.5 mm in the front view of the first surface 7. The width W1 may be evaluated in a cross section orthogonal to the first corner 3. FIG. 8 may illustrate, for example, the width W1. The width W1 may be a distance between a straight line that passes through the first corner 3 and is parallel to the central axis P, and a straight line that passes through the first cutting edge 23 and is parallel to the central axis P in the cross section as illustrated in FIG. 8.

The width W1 of the first land surface 15 may be kept approximately constant from a first end Q1 of the first corner 3 (a left end portion in FIG. 4) to a second end Q2 (a right end portion in FIG. 4), or may be changed from the first end to the second end.

For example, the width W1 may decrease from a midportion of the first land surface 15 toward the first end Q1 and toward the second end Q2. Alternatively, the width W1 may increase from the midportion of the first land surface 15 toward the first end Q1 and toward the second end Q2.

Figure 9:
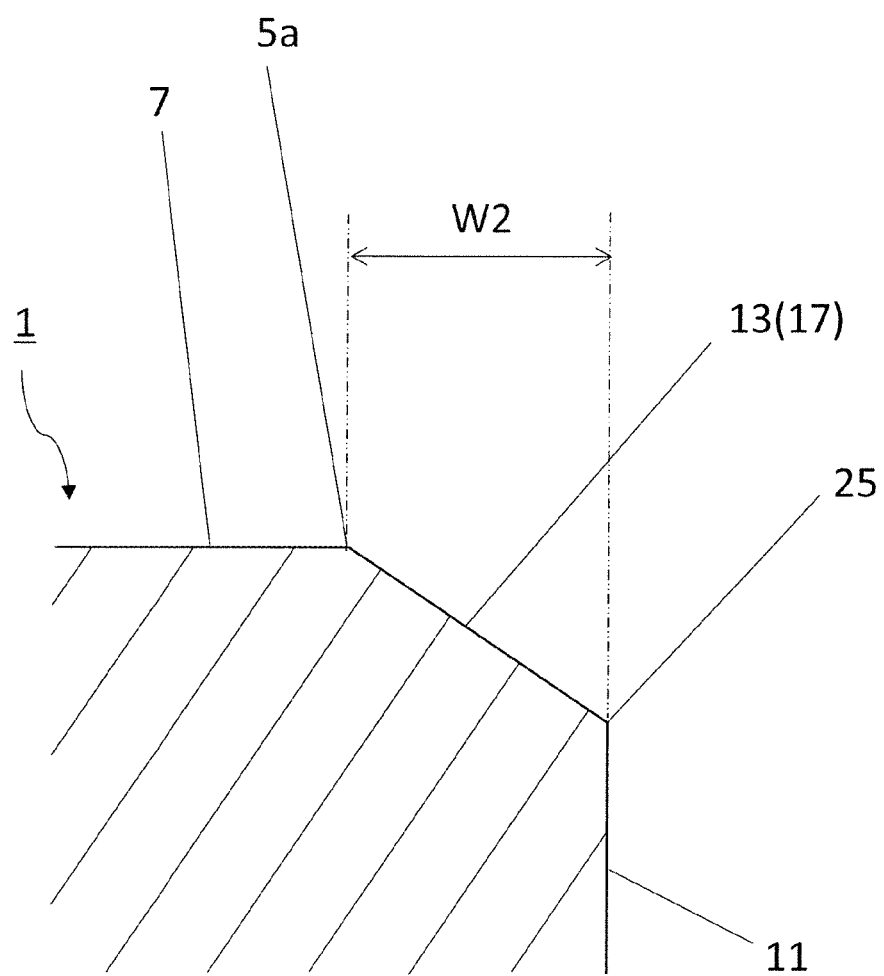
FIG. 9 is a sectional view taken along line IX-IX in FIG. 4.

In a non-limiting embodiment illustrated in FIG. 9 that is a cross section orthogonal to the first side 5a, the second land surface 17 may be inclined relative to the first surface 7 and the third surface 11, and may have a straight line shape. Similarly to the first land surface 15, the second land surface 17 may not be a straight line in the cross section illustrated in FIG. 9.

A width W2 of the second land surface 17 in a direction orthogonal to the first side 5a may be settable to, for example, approximately 0.01-0.5 mm in the front view of the first surface 7. The width W2 may be evaluated in the cross section orthogonal to the first side 5a. FIG. 9 may illustrate, for example, the width W2. The width W2 may be a distance between a straight line that passes through the first side 5a and is parallel to the central axis P, and a straight line that passes through the second cutting edge 25 and is parallel to the central axis P in the cross section as illustrated in FIG. 9.

The width W2 of the second land surface 17 may be kept approximately constant or may be changed from a portion R1 closest to the first corner 3 (a left oblique lower end portion in FIG. 4) to a portion R2 farthermost from the first corner 3 (a right oblique upper end portion in FIG. 4).

For example, the width W2 may be largest or smallest at a part R1 of the second land surface 17 which is located closest to the first corner 3. The width W2 may be largest or smallest at a part R2 of the second land surface 17 which is located furthest from the first corner 3.

Figure 10:
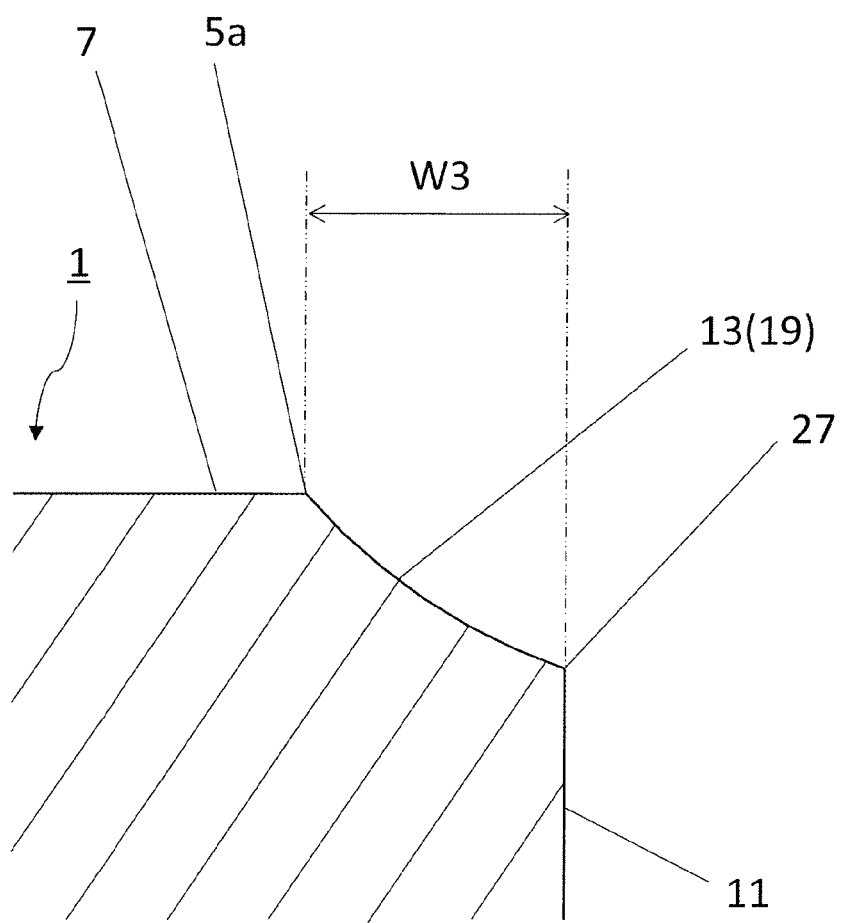
FIG. 10 is a sectional view taken along line X-X in FIG. 4.

The third land surface 19 may be inclined relative to the first surface 7 and the third surface 11 in a non-limiting embodiment illustrated in FIG. 10. The third land surface 19 may have a concave shape recessed inward of the insert 1 in the cross section orthogonal to the first side 5a. The third land surface 19 may have a curvilinear shape in the cross section orthogonal to the first side 5a as in a non-limiting embodiment illustrated in FIG. 10. If the third land surface 19 has a concave curvilinear shape in the above cross section, chips may tend to smoothly flow over the third land surface 19. Chip clogging may be less likely to occur, leading to improved chip discharge performance.

Figure 11:
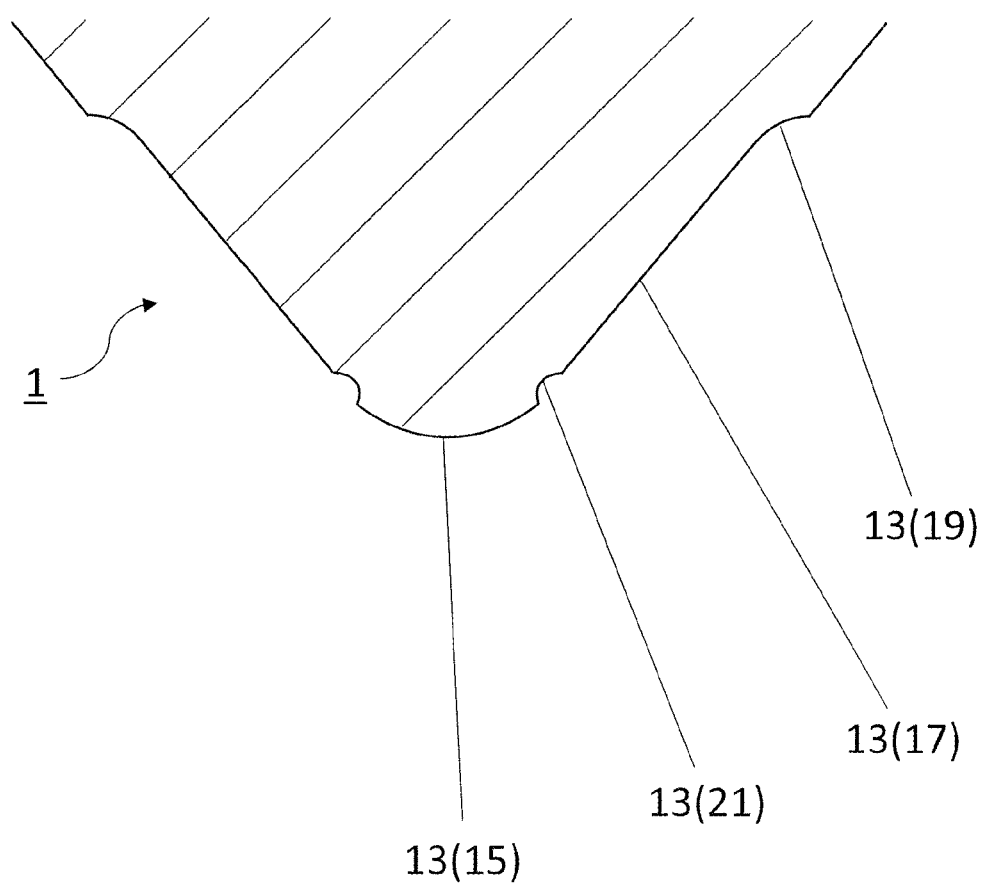
FIG. 11 is a sectional view taken along line XI-XI in FIG. 5.

FIG. 11 may be a cross section orthogonal to the central axis P. The third land surface 19 may have a concave shape recessed inward of the insert 1 in a non-limiting embodiment illustrated in FIG. 11. The concave shape of the third land surface 19 may be a curved surface shape. For example, the third land surface 19 may have a curvilinear shape in the cross section orthogonal to the central axis P as in a non-limiting embodiment illustrated in FIG. 11.

If the third land surface 19 has the curved surface shape in the cross section orthogonal to the central axis P, the third land surface 19 may have enhanced durability. The third land surface 19 may be therefore less prone to cracking. In particular, if the curvilinear shape of the third land surface 19 is a circular arc shape, the third land surface may have further enhanced durability.

A maximum value of a width W3 of the third land surface 19 in the direction orthogonal to the first side 5a may be settable to, for example, approximately 0.01-0.5 mm in the front view of the first surface 7. The width W3 of the third land surface 19 may become smaller as going away from the second land surface 17 in a non-limiting embodiment illustrated in FIG. 4.

The width W3 may be evaluated in the cross section orthogonal to the first side 5a. FIG. 10 may illustrate, for example, the width W3. The width W3 may be a distance between a straight line that passes through the first side 5a and is parallel to the central axis P, and a straight line that passes through the third cutting edge 27 and is parallel to the central axis P in the cross section as illustrated in FIG. 10.

In the front view of the first surface 7, the third land surface 19 may include a part thereof where the width W3 in the direction orthogonal to the first side 5a on the third land surface 19 is larger than the width W2 in the direction orthogonal to the first side 5a on the second land surface 17.

In other words, the maximum value of the width W3 may be larger than a maximum value of the width W2 in the front view of the first surface 7. If the third land surface 19 is configured as described above, it is possible to more suitably guide chips on the third land surface 19, thereby further stabilizing a chip flow direction.

The land surface 13 may further include a fourth land surface 21. The fourth land surface 21 may be located between the first land surface 15 and the second land surface 17, and may have a concave shape recessed inward of the insert 1. The fourth land surface 21 may be located along the vicinity of a boundary between the first corner 3 and the first side 5a in an intersection of the first surface 7 and the land surface 13 in a non-limiting embodiment illustrated in FIG. 4.

The phrase that "the fourth land surface 21 has the concave shape" in the present disclosure may denote being a shape satisfying at least one of the following two conditions. The first condition may be that an intersection of the first surface 7 and the fourth land surface 21 has a concave shape in the front view of the first surface 7. The second condition may be that the fourth land surface 21 has a concave shape in the cross section orthogonal to the central axis P.

If the land surface 13 includes the fourth land surface 21, it may be easy to obtain a better machined surface. Chips generated by the first cutting edge 23 may tend to be guided by the fourth land surface 21 so as to be discharged in the feed direction of the cutting tool. The chips may be therefore less liable to flow toward the machined surface of the workpiece, and the machined surface may be less prone to damage.

An intersection of the first surface 7 and the fourth land surface 21 may have a concave shape recessed inward of the insert 1 in the front view of the first surface 7 as illustrated in FIG. 4. The fourth land surface 21 may have a concave shape recessed inward of the insert 1 in the cross section orthogonal to the central axis P in a non-limiting embodiment illustrated in FIG. 11.

The concave shape of the fourth land surface 21 which is recessed inward of the insert 1 may be a curved surface shape. The fourth land surface 21 may have a curvilinear shape in the cross section orthogonal to the central axis P of the hole 39 as in a non-limiting embodiment illustrated in FIG. 11. If the concave shape of the fourth land surface 21 is the curved surface shape, the fourth land surface 21 may be less prone to cracking, thus leading to enhanced durability of the fourth land surface 21.

Figure 12:
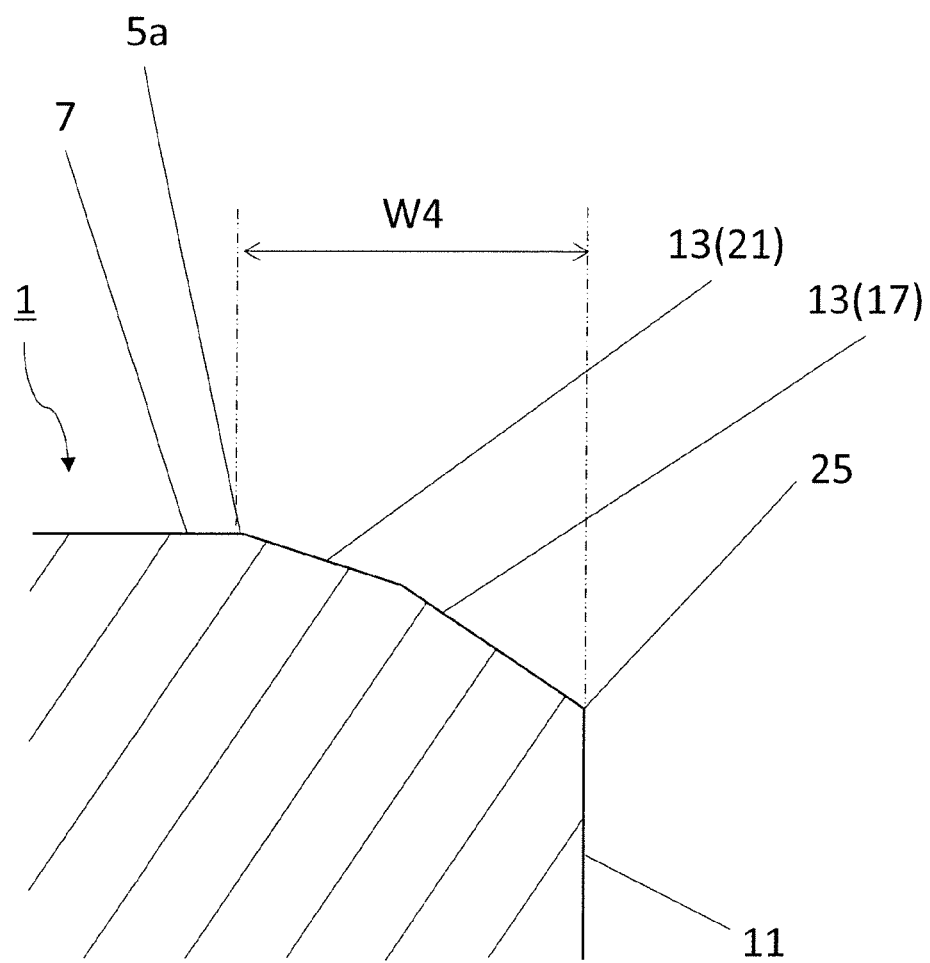
FIG. 12 is a sectional view taken along line XII-XII in FIG. 4.
Figure 13:
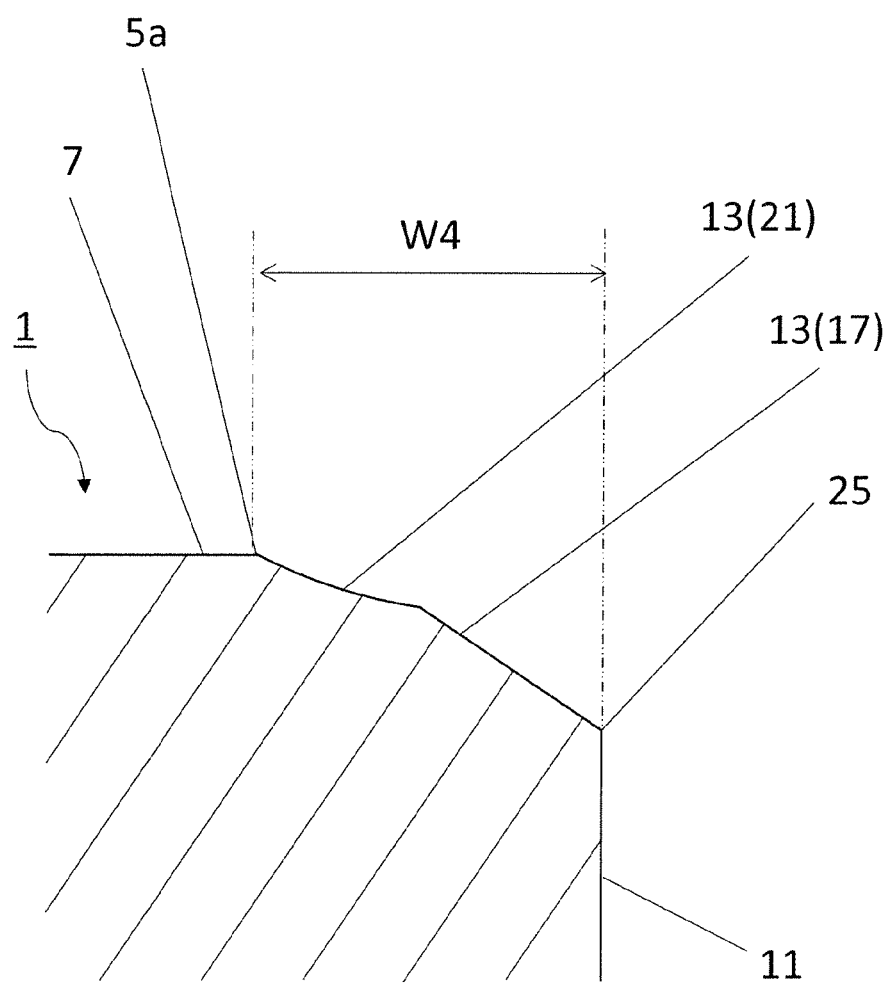
FIG. 13 is a sectional view of a cutting insert in a non-limiting embodiment.

Alternatively, the fourth land surface 21 may have a straight line shape in the cross section orthogonal to the intersection of the first surface 7 and the land surface 13 as in a non-limiting embodiment illustrated in FIG. 12. Still alternatively, the fourth land surface 21 may have a curvilinear shape as in a non-limiting embodiment illustrated in FIG. 13. If the fourth land surface 21 has the concave curvilinear shape in the cross section, chips may tend to smoothly flow over the fourth land surface 21. Hence, chip clogging can be reduced to improve chip discharge performance. The curvilinear shape of the fourth land surface 21 may be a circular arc shape in the cross section described above. FIG. 13 may be a sectional view corresponding to the sectional view in FIG. 12, which relates to the insert 1 illustrated in FIG. 1, in the insert 1 of a non-limiting embodiment.

A width of the fourth land surface 21 in the direction orthogonal to the intersection of the third surface 11 and the second land surface 17 may be taken as W4 in the front view of the first surface 7. The width W4 may include a portion thereof larger than the width W2.

In other words, a maximum value of the width W4 may be larger than the maximum value of the width W2 in the front view of the first surface 7. If the fourth land surface 21 is configured as described above, chips can be more suitably guided on the fourth land surface 21. It may be therefore possible to stably discharge the chips in the feed direction of the cutting tool. Consequently, the chips may be less likely to flow to the machined surface of the workpiece, and the machined surface may be less prone to damage, thus leading to a good machined surface.

FIG. 12 may be a cross section orthogonal to the intersection of the first surface 7 and the land surface 13, namely, the first side 5a. The width W4 may be evaluated in the cross section orthogonal to the first side 5a. For example, FIG. 12 may illustrate the width W4. The width W4 may be a distance between a straight line that passes through the first side 5a and is parallel to the central axis P, and a straight line that passes through the second cutting edge 25 and is parallel to the central axis P.

Figure 3:
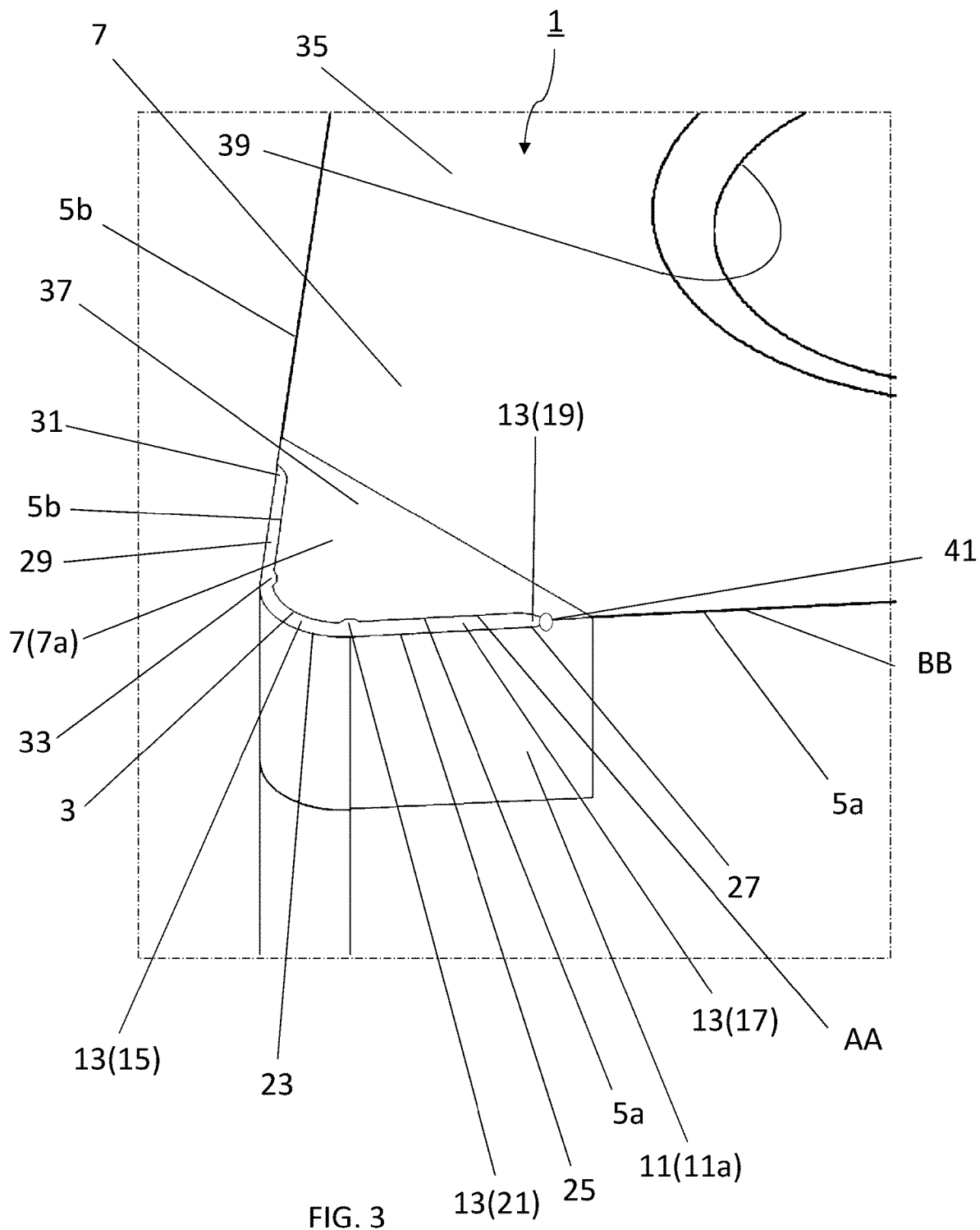
FIG. 3 is an enlarged view illustrating a region A1 in FIG. 1.

The first surface 7 may further include a second side 5b extended from the first corner 3 as illustrated in FIG. 3. The land surface 13 may further include a fifth land surface 29 and a sixth land surface 31. The fifth land surface 29 may be located along the second side 5b. The sixth land surface 31 may be adjacent to the fifth land surface 29, and may be located further away from the first land surface 15 than the fifth land surface 29. The sixth land surface 31 may have a concave shape. In this case, an intersection of the third surface 11 and both the fifth land surface 29 and the sixth land surface 31 may be also a part of the cutting edge.

The fifth land surface 29 may include a configuration similar to that of the second land surface 17. The sixth land surface 31 may include a configuration similar to that of the third land surface 19. The fifth land surface 29 may be therefore capable of producing an effect similar to that of the second land surface 17. The sixth land surface 31 may be therefore capable of producing an effect similar to that of the third land surface 19.

In a non-limiting embodiment illustrated in FIG. 4, the second land surface 17 and the third land surface 19 may be linearly symmetrical with the first land surface 29 and the sixth land surface 31 on the basis of a bisector of the first corner 3 in the front view of the first surface 7. If the land surface 13 is configured as described above, the insert 1 may be usable for either of right and left handed cutting tools. The insert 1 in a non-limiting embodiment may have excellent economical efficiency.

The land surface 13 may further include a seventh land surface 33 having a concave shape which is located between the first land surface 15 and the fifth land surface 29. The seventh land surface 33 in a non-limiting embodiment illustrated in FIG. 4 may have a configuration similar to that of the fourth land surface 21.

In cases where the land surface 13 includes the fifth land surface 29, the sixth land surface 31 and the seventh land surface 33, the fifth land surface 29, the sixth land surface 31 and the seventh land surface 33 need not necessarily be linearly symmetrical with the second land surface 17, the third land surface 19 and the fourth land surface 21 on the basis of the bisector of the first corner 3.

Examples of material of the insert 1 may include cemented carbide, cermet, ceramics, PCD (polycrystal diamond) and cBN (cubic boron nitride).

Examples of composition of cemented carbide may include WC (tungsten carbide)—Co, WC—TiC (titanium carbide)—Co and WC—TiC—TaC (tantalum carbide)—Co. Specifically, WC, TiC and TaC may be hard particles, and Co may be a binding phase. The cermet may be a sintered composite material obtainable by compositing metal into a ceramic component. Specific examples of the cermet may include compounds composed mainly of TiC or TiN (titanium nitride). The material of the insert 1 is not limited to these materials.

The insert 1 may be constituted by only one member composed of the material exemplified above. Alternatively, the insert 1 may be constituted by a plurality of members composed of the material exemplified above.

The insert 1 may be constituted by a main body 35 and a cutting part 37 as illustrated in FIG. 1, and may be formed into a polygonal plate shape as a whole. The main body 35 may have an approximately polygonal plate shape and corners thereof partially include a cut-out portion. The cutting part 37 may be configured to be joined to the cut-out portion by using, for example, a brazing material. The first corner 3 and the first side 5a may be located on the cutting part 37 in a non-limiting embodiment illustrated in FIG. 1. In order to facilitate visual understanding, a region of the cutting part 37 may be hatched by slant lines in FIG. 1.

In cases where a material whose hardness is relatively high, such as PCD or cBN, is used as a material of the cutting part 37, and cemented carbide, cermet, ceramics, or the like is used as a material of the main body 35, enhanced durability of the insert 1 against cutting load may be ensured while making it possible to inexpensively manufacture the insert 1. The hardness of the main body 35 and the cutting part 37 may be evaluated by measuring Vickers hardness of their respective parts.

Although the insert 1 may be constituted only by the main body 35 and the cutting part 37, the insert 1 may further include, besides the main body 35 and the cutting part 37, a coating layer (not illustrated) that covers the surface of the main body 35 and the surface of the cutting part 37. The coating layer may cover the whole or part of the surface of the base member constituted by the main body 35 and the cutting part 37.

Examples of material of the coating layer include aluminum oxide (alumina), and carbides, nitrides, oxides, carbonates, nitrogen oxides, carbonitrides and carboxynitrides of titanium. The coating layer may include only one or a plurality of the above-mentioned materials.

The coating layer may be composed of only one layer or a structure composed of a plurality of layers laminated one upon another. The material of the coating layer is not limited to these materials. The coating layer can be located on the base material by using chemical vapor deposition (CVD) method or physical vapor deposition (PVD) method.

<Cutting Tools>

The cutting tool 101 in a non-limiting embodiment may be described below with reference to the drawings.

Figure 14:
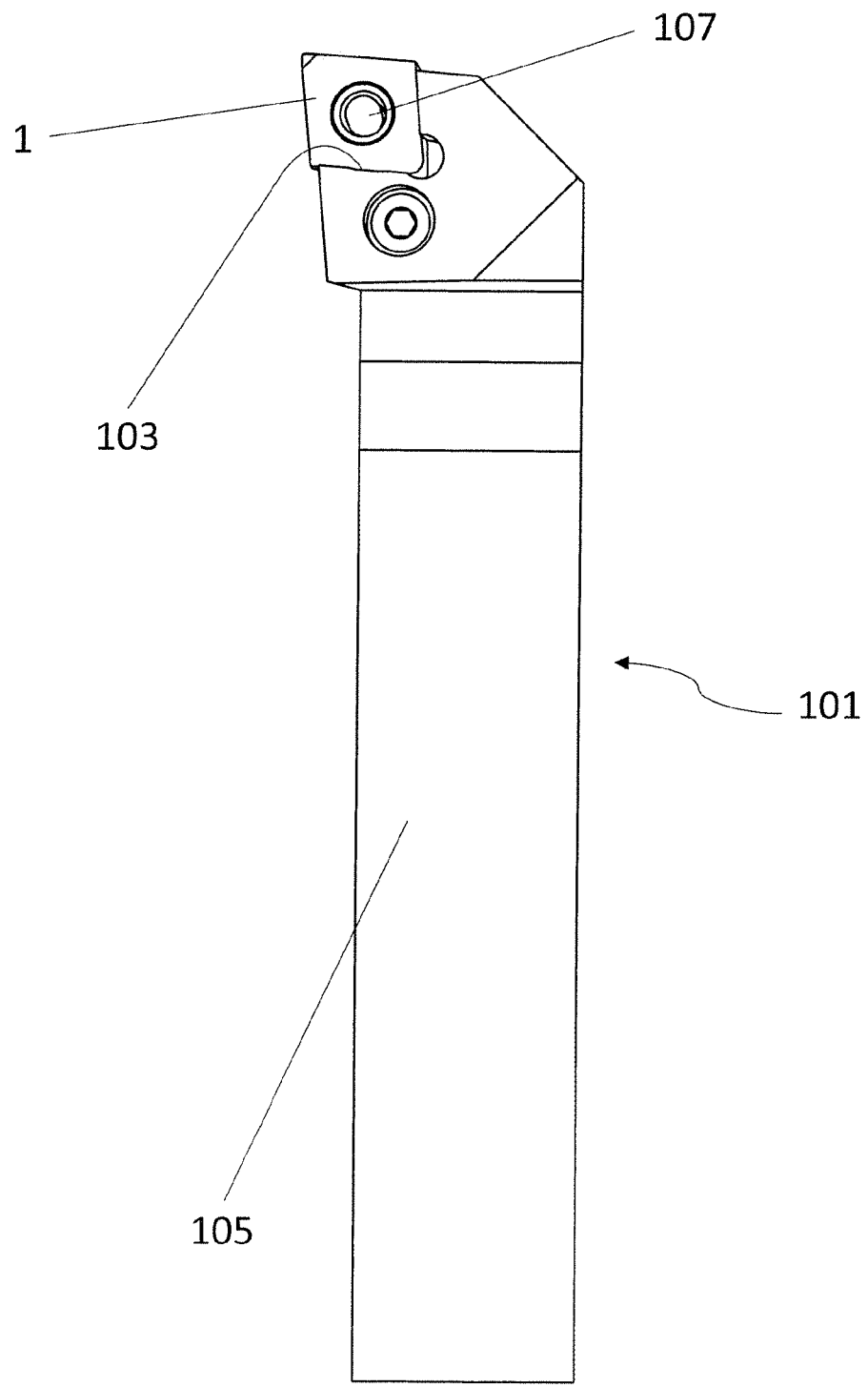
FIG. 14 is a side view illustrating a cutting tool in a non-limiting embodiment of the present disclosure.

As illustrated in FIG. 14, the cutting tool 101 in a non-limiting embodiment may include a holder 105 including a pocket 103 (insert pocket) on a side of a front end thereof, and the insert 1 located in the pocket 103. The insert 1 may be attached so that at least a part of the cutting edge may be protruded from the front end of the holder 105 in the cutting tool 101 in a non-limiting embodiment.

The holder 105 may have a long narrow bar shape. The single pocket 103 may be disposed on a side of the front end of the holder 105. The pocket 103 may be a portion that permits attachment of the insert 1 and opens into a front end surface of the holder 105. Alternatively, the pocket 103 may also open into a side surface of the holder 105. This may facilitate the attachment of the insert 1. Specifically, the pocket 103 may include a seating surface parallel to a lower surface of the holder 105, and a constraining side surface inclined relative to the seating surface.

The insert 1 may be located in the pocket 103. The lower surface of the insert 1 may be directly contacted with the pocket 103. Alternatively, a sheet may be disposed between the insert 1 and the pocket 103.

The insert 1 may be attached so that the cutting edges may be protruded outward from the holder 105. The insert 1 may be attached to the holder 105 by a clamping member 107 in a non-limiting embodiment. Specifically, a head part of the clamping member 107 may be pressed against an inner wall of the hole of the insert 1 so as to constrain the insert 1 in the pocket 103.

For example, steel or cast iron may be usable for the holder 105. Of these materials, steel may be used from the viewpoint of enhancing toughness of the holder 105.

A non-limiting embodiment may have illustrated and described the cutting tools for use in a so-called turning process. Examples of the turning process may include inner diameter processing, outer diameter processing and grooving process. The cutting tools are not limited to ones which are used for the turning process. For example, the cutting inserts 1 in the above non-limiting embodiments may be used for a cutting tool for use in a milling process.

<Method for Manufacturing Machined Product>

A method for manufacturing a machined product in non-limiting embodiments of the present invention may be described below with reference to the drawings.

A machined product may be manufacturable by carrying out a cutting process of a workpiece 201. The method for manufacturing a machined product in a non-limiting embodiment may include the following steps:

(1) rotating the workpiece 201;
(2) bringing the cutting tool 101 represented by the above non-limiting embodiment into contact with the workpiece 201 being rotated; and
(3) moving the cutting tool 101 away from the workpiece 201.

Figure 15:
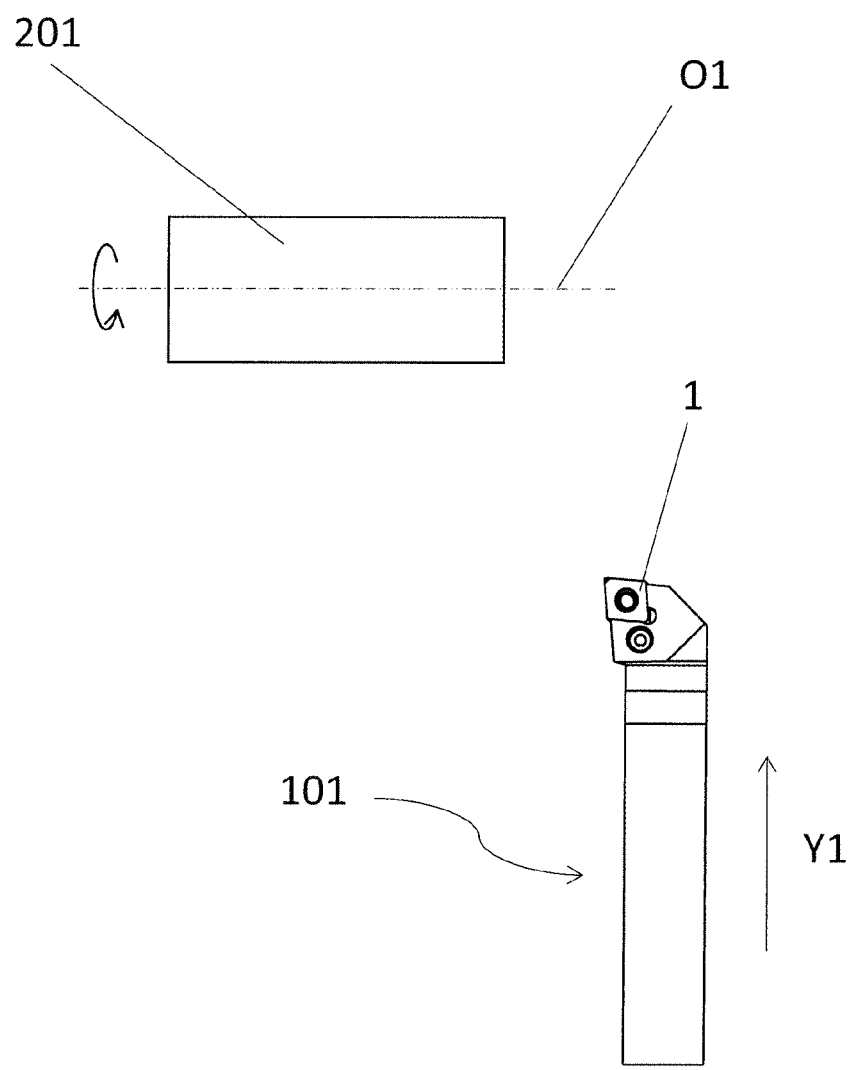
FIG. 15 is a diagram illustrating one of steps in a method for manufacturing a machined product in a non-limiting embodiment of the present disclosure.
Figure 16:
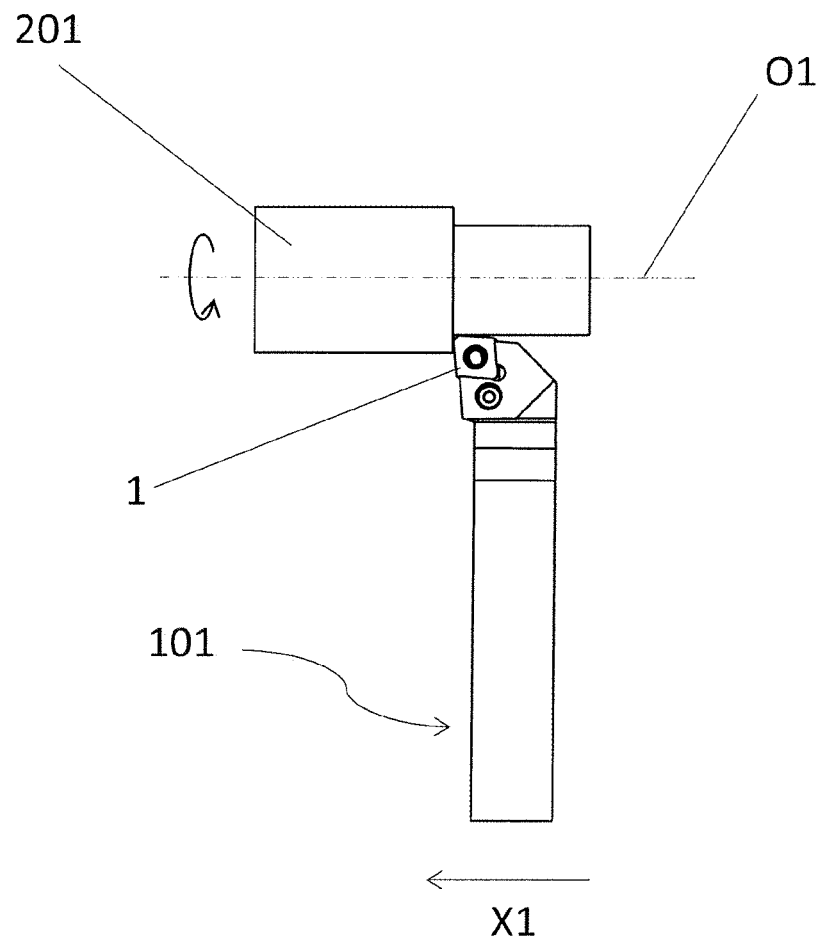
FIG. 16 is a diagram illustrating one of the steps in the method for manufacturing a machined product in a non-limiting embodiment of the present disclosure.

More specifically, the workpiece 201 may be firstly rotated around an axis O1, and the cutting tool 101 may be relatively brought near the workpiece 201 as illustrated in FIG. 15. The workpiece 201 may be then cut out by bringing the cutting edge in the cutting tool 101 into contact with the workpiece 201 as illustrated in FIG. 16. Thereafter, the cutting tool 101 may be relatively moved away from the workpiece 201 as illustrated in FIG. 17.

In the above non-limiting embodiment, the cutting tool 101 may be brought near the workpiece 201 by moving the cutting tool 101 in a Y1 direction in a state in which the axis O1 is fixed and the workpiece 201 is rotated. In FIG. 16, the workpiece 201 may be cut out by bringing the cutting edge in the insert 1 into contact with the workpiece 201 being rotated, followed by movement in an X1 direction. In FIG. 17, the cutting tool 101 may be moved away by moving the cutting tool 101 in a Y2 direction in a state in which the workpiece 201 is rotated.

During the cutting process with the manufacturing method in a non-limiting embodiment, the cutting tool 101 may be brought into contact with the workpiece 201, or the cutting tool 101 may be moved away from the workpiece 201 by moving the cutting tool 101 in each of the above steps. However, it is not intended to limit to this non-limiting embodiment.

For example, the workpiece 201 may be brought near the cutting tool 101 in the step (1). Similarly, the workpiece 201 may be moved away from the cutting tool 101 in the step (3). If desired to continue the cutting process, the step of bringing the cutting edge in the insert 1 into contact with different portions of the workpiece 201 may be repeated while keeping the workpiece 201 rotated.

Representative examples of material of the workpiece 201 may include carbon steel, alloy steel, stainless steel, cast iron and nonferrous metals.

DESCRIPTION OF THE REFERENCE NUMERAL 1 cutting insert (insert)
3 first corner
5a first side
5b second side
7 first surface
9 second surface
11 third surface
13 land surface
15 first land surface
17 second land surface
19 third land surface
21 fourth land surface
23 first cutting edge
25 second cutting edge
27 third cutting edge
29 fifth land surface
31 sixth land surface
33 seventh land surface
35 main body
37 cutting part
39 hole
101 cutting tool
103 pocket
105 holder
107 clamping member
201 workpiece
  P central axis of hole
  W1 width of first land surface
  W2 width of second land surface
  W3 width of third land surface

The invention claimed is:

1. A cutting insert, comprising:
a first surface having a polygonal shape and comprising a first corner,
a second corner adjacent to the first corner, and
a first side extended from the first corner to the second corner, the first side comprising a first part connected to the first corner and extending in a direction towards the second corner to a first part distal end, and a second part extended from the first part distal end to the second corner;
a second surface located on a side opposite to the first surface;
a third surface located between the first surface and the second surface; and
a land surface connected to the first surface and the third surface and inclined relative to the first surface and the third surface, wherein
the land surface is located along the first part to the first part distal end, the third surface is connected to the first surface at the second part, and the third surface is connected to the land surface at the first part;
the land surface comprises:
a first land surface located along the first corner,
a second land surface located along the first part of the first side, and
a third land surface located along the first part of the first side and located further away from the first land surface than the second land surface, and
the third land surface has a concave shape in a cross-sectional view extending from the first surface to the second surface.

2. The cutting insert according to claim 1, wherein, in the top view, the land surface further comprises a fourth land surface having a concave shape located between the first land surface and the second land surface.

3. The cutting insert according to claim 2, wherein the fourth land surface has a curvilinear shape in a cross section orthogonal to the first side.

4. The cutting insert according to claim 3, wherein the curvilinear shape of the fourth land surface is a circular arc shape in the cross section orthogonal to the first side.

5. The cutting insert according to claim 1, wherein, in the top view, the third land surface comprises a part thereof where a width in a direction orthogonal to the first side on the third land surface is larger than a width in the direction orthogonal to the first side on the second land surface.

6. A cutting tool, comprising:
a holder comprising a pocket located on a side of a front end of the holder; and
the cutting insert according to claim 1, the cutting insert being located in the pocket.

7. A method for manufacturing a machined product, comprising:
rotating a workpiece;
bringing the cutting tool according to claim 6 into contact with the workpiece being rotated; and
moving the cutting tool away from the workpiece.

8. A cutting insert, comprising:
a first surface having a polygonal shape and comprising
a first corner,
a second corner adjacent to the first corner, and
a first side extended from the first corner to the second corner;
a second surface located on a side opposite to the first surface;
a third surface located between the first surface and the second surface; and
a land surface connected to the first surface and the third surface and inclined relative to the first surface and the third surface, wherein
the land surface is not connected to the second corner,
the first surface connects to the third surface at the second corner, and
the land surface comprises:
a first land surface located along the first corner,
a second land surface located along the first side, and
a third land surface having a concave shape, in a cross-sectional view extending from the first surface to the second surface, and which is adjacent to the second land surface and located closer to the second corner than the first land surface and the second land surface.

9. A cutting insert, comprising:
a first surface having a polygonal shape and comprising
a first corner, and
a first side extended from the first corner to a first side distal end and comprising
a first part connected to the first corner and extending in a direction towards the first side distal end to a first part distal end, and
a second part extended from the first part distal end to the first side distal end,
a second surface located on a side opposite to the first surface;
a third surface located between the first surface and the second surface; and
a land surface connected to the first surface and the third surface and inclined relative to the first surface and the third surface, wherein
the land surface is located along the first part to the first part distal end,
the first surface connects to the third surface at the second part, and
the land surface comprises:
a first land surface located along the first corner,
a second land surface located along the first side, and
a third land surface having a concave shape in a cross-sectional view extending from the first surface to the second surface, and which is adjacent to the second land surface and which is in contact with the second part.

* * * * *